United States Patent
Dunbar

(10) Patent No.: US 11,358,564 B2
(45) Date of Patent: Jun. 14, 2022

(54) TRUCK BED SAFETY BELT

(71) Applicant: Lecia Dunbar, Marietta, GA (US)

(72) Inventor: Lecia Dunbar, Marietta, GA (US)

( * ) Notice: Subject to any disclaimer, the term of this patent is extended or adjusted under 35 U.S.C. 154(b) by 0 days.

(21) Appl. No.: 16/928,011

(22) Filed: Jul. 14, 2020

(65) Prior Publication Data

US 2021/0206338 A1 Jul. 8, 2021

Related U.S. Application Data

(60) Provisional application No. 62/958,322, filed on Jan. 8, 2020.

(51) Int. Cl.
*B60R 22/22* (2006.01)
*B60R 22/18* (2006.01)

(52) U.S. Cl.
CPC ...... *B60R 22/22* (2013.01); *B60R 2022/1806* (2013.01)

(58) Field of Classification Search
CPC ............ B60R 22/22; B60R 2022/1806; B60N 2/3095; B60N 2/005; B60N 2/015; B60N 2/24; B60N 2/688; Y10S 280/05
USPC ....................................... 280/801.1
See application file for complete search history.

(56) References Cited

U.S. PATENT DOCUMENTS

| | | | | |
|---|---|---|---|---|
| 4,911,493 A | * | 3/1990 | Muirhead | B60P 3/38 296/37.6 |
| 5,029,928 A | * | 7/1991 | Huber | B60P 3/423 296/63 |
| 5,501,501 A | * | 3/1996 | White | B60N 2/3013 296/64 |
| 5,826,906 A | * | 10/1998 | Drop, Sr. | B60R 22/00 280/801.1 |
| 6,932,408 B1 | * | 8/2005 | Lyod, Jr | B60N 2/005 296/63 |
| 2008/0067829 A1 | * | 3/2008 | Arias | B60R 22/22 296/65.03 |

OTHER PUBLICATIONS

Red Hawks Seatbelt Kit includes (2) 60" Fully Extended Lap Seatbelts, Seatbelt Bracket and Hardware accessed by way back machine from Mar. 23, 2017. http://www.golfcart.com/pc_product_detail.asp?key=0EFA967DF72E4C63AAFD9EC5C006DBA1 (Year: 2017).*
Everythingcarts, How to install Seat Belt Bracket on a golf cart published Aug. 4, 2010, found at https://youtu.be/6cIDE-xGGUg (Year: 2010).*

* cited by examiner

*Primary Examiner* — Paul N Dickson
*Assistant Examiner* — Caitlin Anne Miller
(74) *Attorney, Agent, or Firm* — Charlena Thorpe, Esq.; Incorporating Innovation LLC

(57) ABSTRACT

Implementations of a truck bed safety belt (or truck bed seat belt) are provided. In some implementations, the truck bed safety belt comprises a first attachment mechanism and a second attachment mechanism, a first belt portion and a second belt portion, and a buckle part and a snap part. In some implementations, the truck bed safety belt further comprises a truck bed attachment bracket.
In some implementations, a method of using the truck bed safety belt comprises attaching the truck bed safety belt to a truck bed, such as of a pickup truck, and connecting the truck bed safety belt to safely restrain a passenger riding in the truck bed.

15 Claims, 9 Drawing Sheets ns 110, 111 respectively. In some
TRUCK BED SAFETY BELT

CROSS REFERENCE TO RELATED APPLICATION

This application claims the benefit of U.S. Patent Application Ser. No. 62/958,322, which was filed on Jan. 8, 2020, and is incorporated herein by reference in its entirety.

TECHNICAL FIELD

This disclosure relates to implementations of a truck bed safety belt (or truck bed seat belt).

BACKGROUND

Laws governing whether a person can ride in the truck bed of a pick-up truck, such as shown in FIG. 1, vary from state to state. For example, twenty states have no laws prohibiting passenger transport in a truck bed. Nevertheless, riding in a truck bed where there are no restraints such as a seat belt is very dangerous. However, there does not currently exist a seat belt that can be easily installed in the truck bed of a pick up truck.

DETAILED DESCRIPTION

Implementations of a truck bed safety belt (or truck bed seat belt) are provided. In some implementations, the truck bed safety belt comprises a first attachment mechanism and a second attachment mechanism, a first belt portion and a second belt portion, and a buckle part and a snap part. In some implementations, the truck bed safety belt further comprises a truck bed attachment bracket.

In some implementations, the truck bed safety belt is configured to provide a seat belt that can be easily installed in the bed of a pickup truck or other suitable vehicle.

In some implementations, the truck bed safety belt is configured to provide a seat belt that can safely restrain or otherwise secure a person riding as a passenger in the bed of a pickup truck or other suitable vehicle.

In some implementations, the truck bed safety belt is configured to be easily installed in the bed of a pickup truck or other suitable vehicle.

In some implementations, a method for using the truck bed safety belt comprises attaching the truck bed safety belt to a truck bed, such as of a pickup truck, and connecting the truck bed safety belt to safely restrain a passenger riding in the truck bed.

Figure 1:
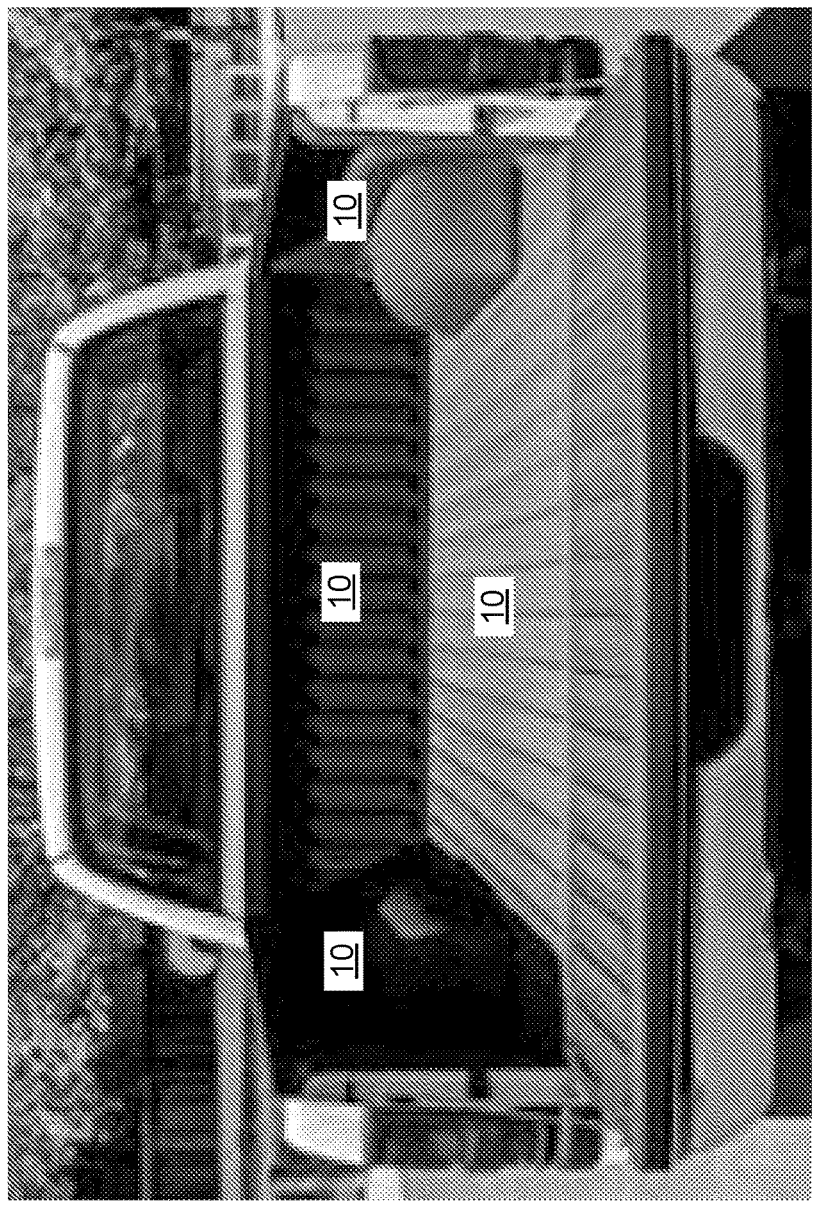
FIG. 1 illustrates an example existing truck bed of a pick-up truck.

FIG. 1 illustrates an example existing truck bed 10 of a pick-up truck 8. Laws governing whether a person can ride in the truck bed 10 of a pick-up truck 8 vary from state to state. For example, twenty states have no laws prohibiting passenger transport in a truck bed 10. Nevertheless, riding in a truck bed 10 where there are no restraints such as a seat belt is very dangerous.

Figure 2:
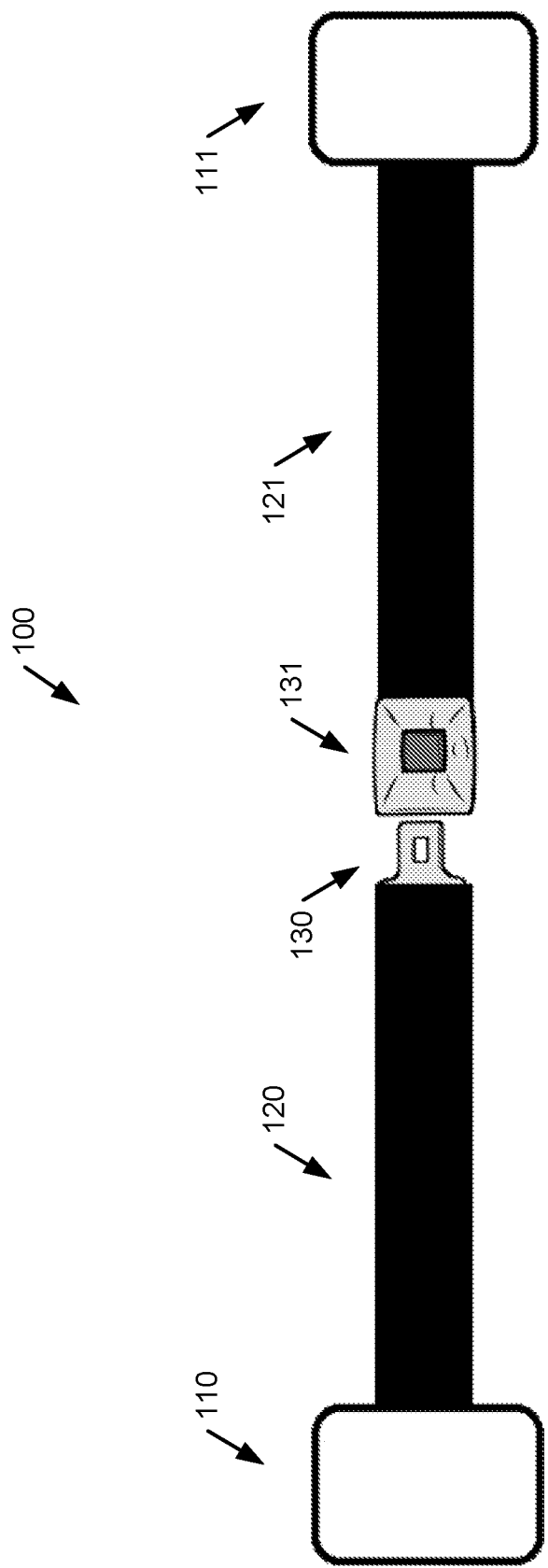
FIG. 2 illustrates an implementation of an example truck bed safety belt according to the present disclosure.
Figure 3:
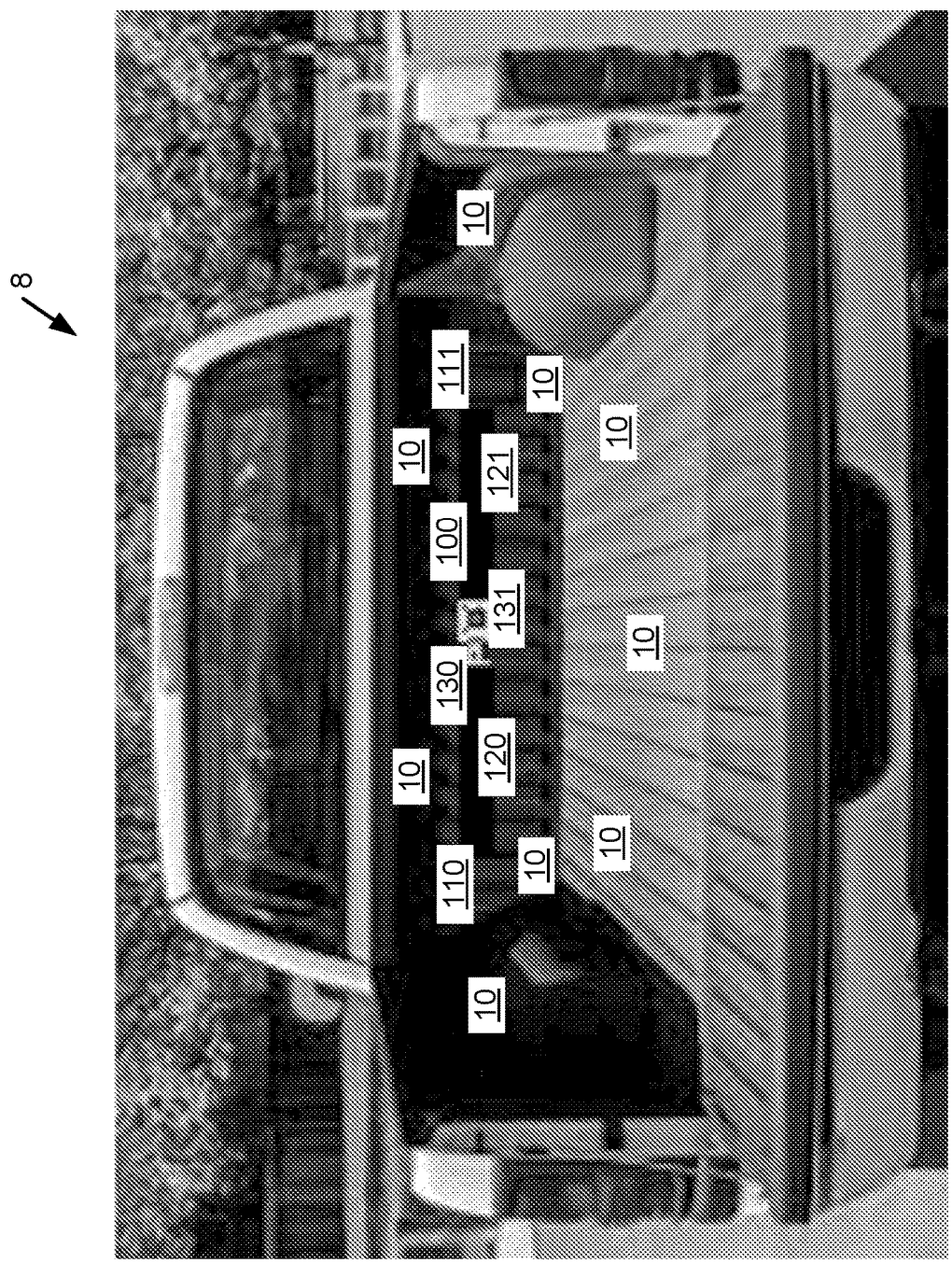
FIG. 3 illustrates an example installation of the truck bed safety belt in the truck bed of a pick up truck for usage.

FIG. 2 illustrates an implementation of an example truck bed safety belt 100 according to the present disclosure. FIG. 3 illustrates an example installation of the truck bed safety belt 100 in the truck bed 10 of a pick up truck 8 for usage.

As shown in FIG. 2, in some implementations, the truck bed safety belt 100 comprises a first attachment mechanism 110 and a second attachment mechanism 111, a first belt portion 120 and a second belt portion 121, and a buckle part 130 and a snap part 131.

As shown in FIG. 2, in some implementations, the first and second attachment mechanisms 110, 111 are connected respectively to the first and second belt portions 120, 121. In some implementations, the attachment mechanisms 110, 111 are connected respectively to the belt portions 120, 121 at a first or proximal end of the belt portions 120, 121. In some implementations, the attachment mechanisms 110, 111 may be connected respectively to the belt portions 120, 121 in any other suitable configuration.

As shown in FIG. 3, in some implementations, the attachment mechanisms 110, 111 are configured to attach to a portion of a truck bed 10, such as a truck bed 10 of a pickup truck 8 described above for FIG. 1. For example, in some implementations, the attachment mechanisms 110, 111 are configured to attach to a wall (e.g., a vertical portion) of a truck bed 10. In some implementations, the attachment mechanisms 110, 111 may be configured to attach to a floor (e.g., a horizontal portion) of a truck bed 10. In some implementations, the attachment mechanisms 110, 111 may be configured to attach to any other suitable portion of a truck bed 10.

In some implementations, the attachment mechanisms 110, 111 may be configured to attach, such as described above, to a bed of any other suitable vehicle.

In some implementations, the attachment mechanisms 110, 111 are configured to attach to a portion of a truck bed 10 at any suitable distance apart. For example, the attachment mechanisms 110, 111 are configured to attach to a portion of a truck bed 10 at a closer distance apart than shown in FIG. 3 such that the truck bed safety belt 100 has a width to fit one person. In some implementations, the attachment mechanisms 110, 111 may be configured to attach to a portion of a truck bed 10 at any other suitable distance apart such that the truck bed safety belt 100 has any other suitable width.

In some implementations, the attachment mechanisms 110, 111 may be configured to be bolted to attach to a truck bed 10. In some implementations, the attachment mechanisms 110, 111 may be configured to be magnetically attached to a truck bed 10. In some implementations, the attachment mechanisms 110, 111 may be configured to be attached to a truck bed 10 in any other suitable way.

In some implementations, the first and/or second attachment mechanisms 110, 111 may be configured respectively to allow the first and/or second belt portions 120, 121 to retract into and/or extend out of the first and/or second attachment mechanisms 110, 111 respectively. In some implementations, the first and/or second attachment mechanisms 110, 111 may be configured respectively to allow the first and/or second belt portions 120, 121 to retract and/or extend from the first and/or second attachment mechanisms 110, 111 respectively in any other suitable configuration.

In some implementations, the first and second belt portions 120, 121 may be similar to the belt portions of a traditional seat belt. In some implementations, the belt portions 120, 121 may have any other suitable configuration.

As shown in FIG. 2, in some implementations, the first and second belt portions 120, 121 are connected respectively to the first and second attachment mechanisms 110, 111. In some implementations, the belt portions 120, 121 are connected respectively to the attachment mechanisms 110, 111 at a first or proximal end of the belt portions 120, 121. In some implementations, the belt portions 120, 121 may be connected respectively to the attachment mechanisms 110, 111 in any other suitable configuration.

As shown in FIG. 2, in some implementations, the first and second belt portions 120, 121 are connected respectively to the buckle part 130 and the snap part 131. In some implementations, the belt portions 120, 121 are connected respectively to the buckle and the snap parts 130, 131 at a second or distal end of the belt portions 120, 121. In some implementations, the belt portions 120, 121 may be connected respectively to the buckle and the snap parts 130, 131 in any other suitable configuration.

As shown in FIG. 2, in some implementations, the first and second belt portions 120, 121 extend respectively between the above described connections to the first and second attachment mechanisms 110, 111 and the buckle and the snap parts 130, 131.

In some implementations, the first and second belt portions 120, 121 are configured to connect together by the buckle and the snap parts 130, 131 to a form a seat belt or restraint. In some implementations, the first and second belt portions 120, 121 may be configured to connect together in any other suitable manner.

In some implementations, the first and second belt portions 120, 121 are composed of separate belts. In some implementations, the first and second belt portions 120, 121 may be composed of a same/single belt.

In some implementations, the first and/or second belt portions 120, 121 may be configured respectively to retract into and/or extend out of the first and/or second attachment mechanisms 110, 111 respectively. In some implementations, the first and/or second belt portions 120, 121 may be configured respectively to retract and/or extend from the first and/or second attachment mechanisms 110, 111 respectively in any other suitable configuration.

In some implementations, the first and/or second belt portions 120, 121 may be configured to be adjustable. For example, in some implementations, the first and/or second belt portions 120, 121 may be configured to be adjustable in length. In some implementations, the first and/or second belt portions 120, 121 may be configured to be adjustable in any other suitable manner.

In some implementations, the buckle and the snap parts 130, 131 may be similar to the buckle and the snap parts respectively of a traditional seat belt. In some implementations, the buckle and the snap parts 130, 131 may be similar to the tongue and the buckle parts respectively of a traditional seat belt.

In some implementations, the buckle and the snap parts 130, 131 may have any other suitable configuration.

As shown in FIG. 2, in some implementations, the buckle part 130 and the snap part 131 are connected respectively to the first and second belt portions 120, 121. In some implementations, the buckle and the snap parts 130, 131 are connected respectively to the belt portions 120, 121 at a second or distal end of the belt portions 120, 121. In some implementations, the buckle and the snap parts 130, 131 may be connected respectively to the belt portions 120, 121 in any other suitable configuration.

In some implementations, the buckle and the snap parts 130, 131 may be configured to connect together similar to the way the buckle and the snap parts of a traditional seat belt connect together. In some implementations, the buckle and the snap parts 130, 131 may be configured to connect together in any other suitable manner.

In some implementations, the buckle and the snap parts 130, 131 are configured to connect the first and second belt portions 120, 121 together to a form a seat belt or restraint. In some implementations, the buckle and the snap parts 130, 131 may be configured to connect the first and second belt portions 120, 121 together similar to the way a traditional seat belt connects together. In some implementations, the buckle and the snap parts 130, 131 may be configured to connect the first and second belt portions 120, 121 together in any other suitable manner.

As shown in FIG. 2, in some implementations, the truck bed safety belt 100 is configured to provide a seat belt that can be easily installed in the truck bed 10 of a pick up truck 8, such as the pickup truck bed 10 described above for FIG. 1.

In some implementations, the truck bed safety belt 100 may be configured to provide a seat belt that can be easily installed in the bed of any other suitable truck or other vehicle, such as described more below.

In some implementations, the truck bed safety belt 100 is configured to provide a seat belt that can safely restrain or otherwise secure a person riding as a passenger in the truck bed 10 of a pick up truck 8.

In some implementations, the truck bed safety belt 100 may be configured to provide a seat belt that can safely restrain or otherwise secure a person riding as a passenger in the bed of any other suitable truck or other vehicle.

As shown in FIG. 3, in some implementations, the truck bed safety belt 100 is configured to be easily installed in a truck bed 10 of a pick up truck 8, such as by attaching the attachment mechanisms 110, 111 as described herein.

In some implementations, the truck bed safety belt 100 may be configured to be easily installed in the bed of any other suitable truck or other vehicle, such as by attaching the attachment mechanisms 110, 111.

In some implementations, the truck bed safety belt 100 may be configured to be easily removable from a pickup truck bed 10 or other suitable vehicle bed, such as by detaching the attachment mechanisms 110, 111.

Figure 4:
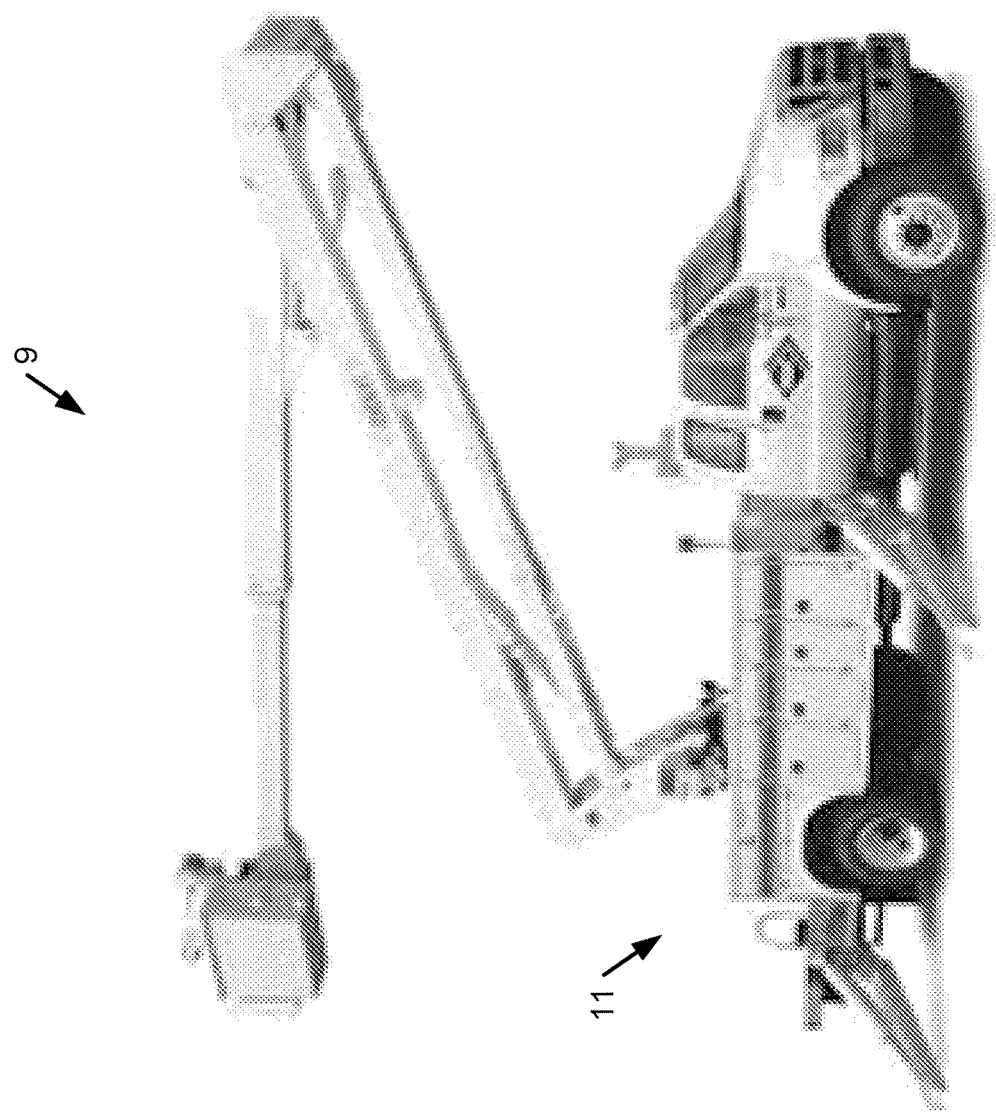
FIG. 4 illustrates an example existing bucket truck that has a truck bed in which the truck bed safety belt can be installed and used.

As described above, in some implementations, the truck bed safety belt 100 may be configured to be installed and used in a bed of any other suitable vehicle. For example, FIG. 4 illustrates an example existing bucket truck 9 that has a truck bed 11 (e.g., similar to the pickup truck bed 10 of FIG. 1) in which the truck bed safety belt 100 can be installed and used, such as described herein.

In some implementations, the truck bed safety belt 100 may be configured to be installed and used in any other suitable truck or other vehicle. In some implementations, the truck bed safety belt 100 may be configured to be installed and used in the bed or any other suitable location of such truck or other vehicle.

Figure 5:
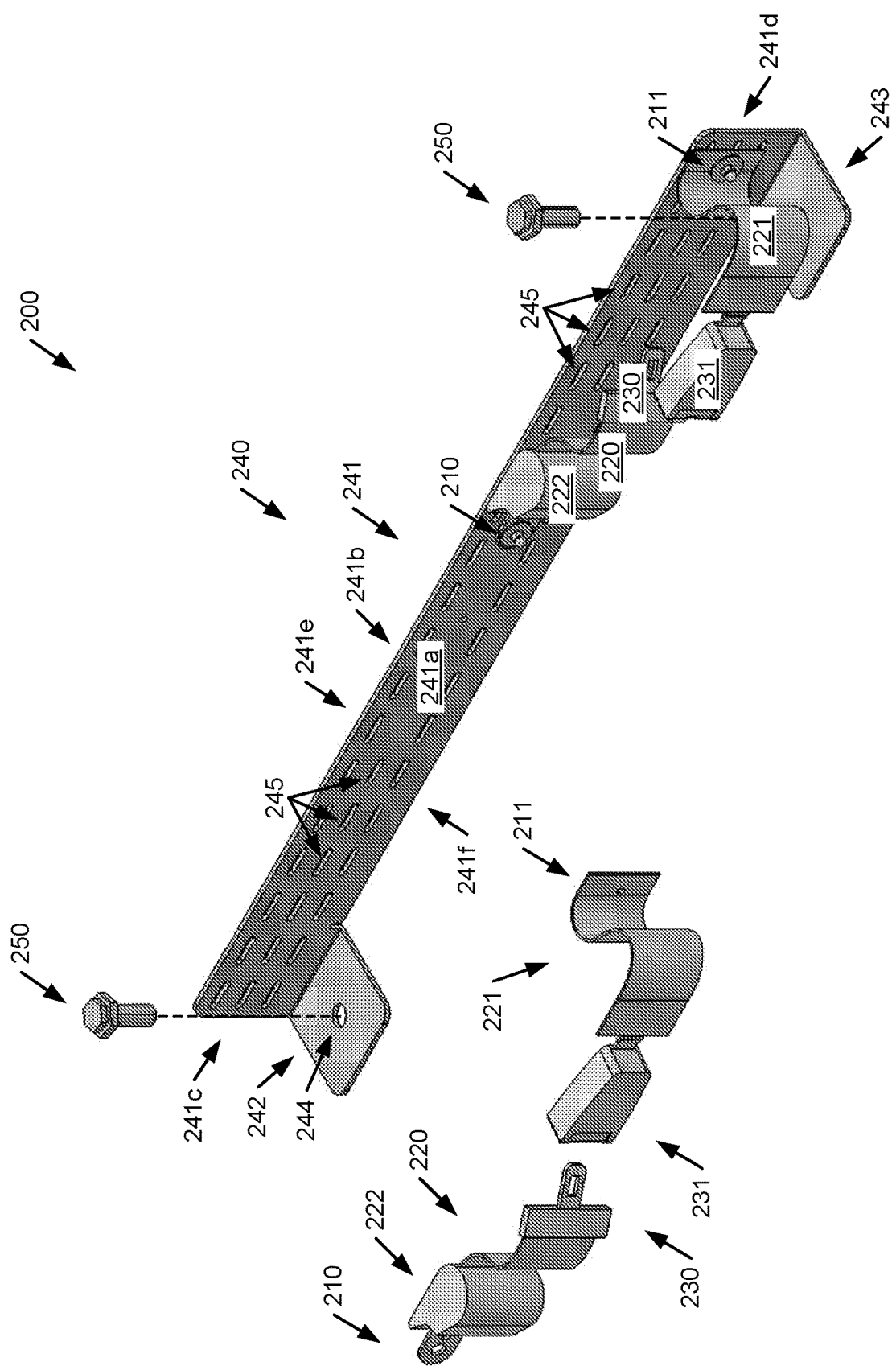
FIGS. 5-7 illustrate another implementation of an example truck bed safety belt according to the present disclosure.
Figure 6:
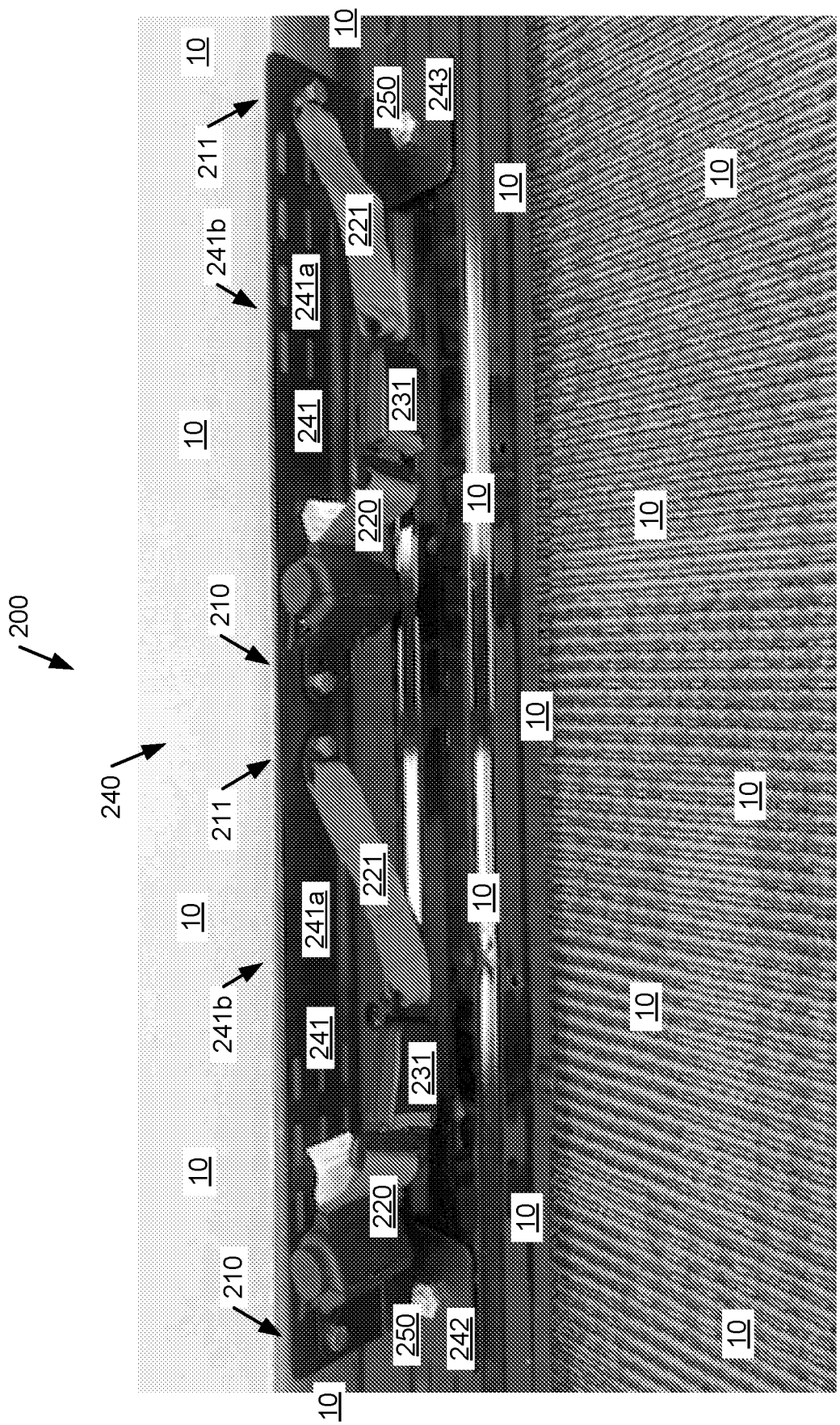
Figure 7:
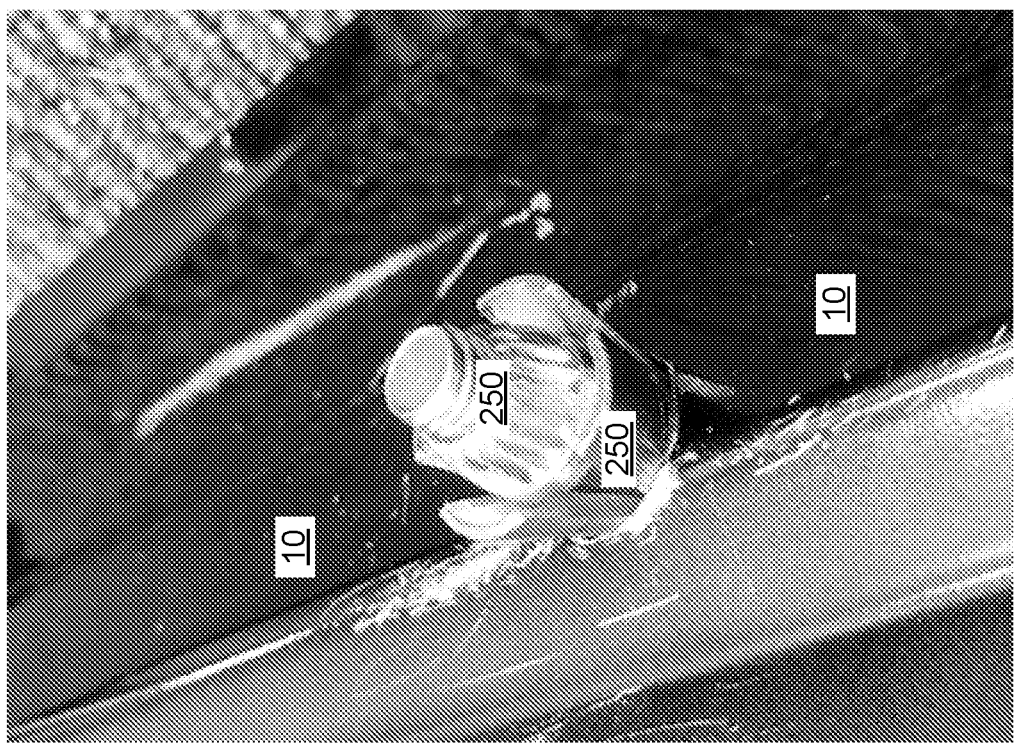

FIGS. 5-7 illustrate another implementation of an example truck bed safety belt 200 according to the present disclosure.

In some implementations, the truck bed safety belt 200 is substantially the same or similar to the above described truck bed safety belt 100. For example, as shown in FIG. 5, in some implementations, the truck bed safety belt 200 comprises a first attachment mechanism 210, a second attachment mechanism 211, a first belt portion 220, a second belt portion 221, a buckle part (e.g., a seat belt tongue) 230, and a snap part (e.g., a seat belt buckle) 231 that are the same or similar to the above described like-named components 110, 111, 120, 121, 130, 131 of the truck bed safety belt 100.

As shown in FIGS. 5 and 6, in some implementations, the truck bed safety belt 200 may comprise one or more sets of the components 210, 211, 220, 221, 230, 231. In some implementations, the truck bed safety belt 200 can thereby provide a seat belt in a truck bed for one or more persons respectively.

As shown in FIGS. 5 and 6, in some implementations, the truck bed safety belt 200 further comprises an attachment bracket 240, which is described below.

As shown in FIG. 5, in some implementations, the attachment mechanisms 210, 211 of the truck bed safety belt 200 may respectively comprise an opening at and/or through the first or distal end of the belt portions 220, 221.

As shown in FIGS. 5 and 6, in some implementations, the attachment mechanisms 210, 211 may further each comprise a fastener. In some implementations, the fastener may comprise a screw/bolt. In some implementations, the fastener may further comprise a locknut or acorn nut.

In some implementations, the fastener may comprise any other suitable components. In some implementations, the fastener may comprise any other suitable form of fastener.

In some implementations, the openings of the attachment mechanisms 210, 211 are each configured to receive the fastener. As shown in FIGS. 5 and 6, in some implementations, the attachment mechanisms 210, 211 are configured to respectively attach the belt portions 220, 221 to the attachment bracket 240 by the fastener received through the opening.

As shown in FIG. 5, in some implementations, one or more of the belt portions 220, 221 may comprise a belt retraction mechanism 222, such as a seat belt retractor. In some implementations, the belt retraction mechanism 222 is configured to retract and allow the extension of the respective belt portion 220, 221 to adjust the length to fit a user.

In some implementations, one or more of the belt portions 220, 221 may comprise any other suitable mechanism to adjust the length of the respective belt portion 220, 221.

As shown in FIG. 5, in some implementations, the attachment bracket 240 comprises an elongated piece 241. In some implementations, the elongated piece 241 may comprise any suitable elongated piece of material. For example, in some implementations, the elongated piece 241 may comprise an elongated strip of galvanized steel.

In some implementations, the elongated piece 241 may have any suitable shape. For example, as shown in FIG. 5, in some implementations, the elongated piece 241 may comprise a first surface 240a and an opposite, second surface 240b.

In some implementations, the surfaces 240a, 240b may be at least generally flat. In some implementations, the surfaces 240a, 240b may be any other suitable shape.

In some implementations, the surfaces 240a, 240b may extend lengthwise and widthwise in any suitable shape.

As shown in FIG. 5, in some implementations, the elongated piece 241 may also comprise a first side 241c, a second side 241d, a third side 241e, and a fourth side 241f. In some implementations, the surfaces 240a, 240b may extend lengthwise between the first side 241c and the second side 241d. In some implementations, the surfaces 240a, 240b may extend widthwise between the third side 241e and the fourth side 241f.

In some implementations, the elongated piece 241 may thereby have an at least generally rectangular prism shape. In some implementations, the elongated piece 241 may thereby have any other suitable shape.

As shown in FIG. 5, in some implementations, the elongated piece 241 may also comprise a plurality of openings 245. In some implementations, the openings 245 extend through the elongated piece 241 including through the first and second surface 240a, 240b.

In some implementations, the openings 245 may have any suitable shape. For example, as shown in FIG. 5, in some implementations, the openings 25 may be slot shaped. In some implementations, the openings 245 may be at least generally circular.

In some implementations, the openings 245 may have different shapes. For example, some of the openings 245 may be slot shaped and some of the openings 245 may be at least generally circular.

In some implementations, the openings 245 may be arranged on the elongated piece 241 in any suitable arrangement. For example, in some implementations, the openings 245 may be aligned in one or more rows that extend lengthwise along the elongated piece 241.

In some implementations, the openings 245 are configured to receive the above described fasteners of the attachment mechanisms 210, 211 such that the belt portions 220, 221 can be attached to the elongated piece 241.

In some implementations, some of the openings 245 may be configured to receive other fasteners, such as the bracket fastener 250 described below, such that the elongated piece 241 can be attached to a truck bed, such as the truck bed 10 described above for FIGS. 1 and 3.

As shown in FIG. 5, in some implementations, the attachment bracket 240 may further comprise one or more extension pieces 242, 243. In some implementations, the extension pieces 242, 243 may extend from the elongated piece 241 in any suitable configuration.

For example, as shown in FIG. 5, in some implementations, the extension pieces 242, 243 may each extend from (or adjacent to) the fourth side 241f of the elongated piece 241. In some implementations, the extension pieces 242, 243 may extend from the fourth side 241f respectively adjacent to the first and second sides 241c, 241d. In some implementations, the extension pieces 242, 243 may extend at least generally perpendicular from the first surface 241a at or adjacent to the fourth side 241f.

In some implementations, the extension pieces 242, 243 may have any suitable shape. For example, in some implementations, the extension pieces 242, 243 may comprise first and second surfaces extending lengthwise and widthwise similar to the elongated piece 241. In some implementations, the extension pieces 242, 243 may be shaped such that the first and second surfaces extend at least generally perpendicular from the first surface 241a of the elongated piece 241.

In some implementations, the extension pieces 242, 243 may be at least generally rectangular prism shaped.

As shown in FIG. 5, in some implementations, the extension pieces 242, 243 may each comprise an opening 244. In some implementations, the extension pieces 242, 243 may comprise more than one opening 244.

In some implementations, the opening 244 may extend through the extension pieces 242, 243 including through the first and second surfaces.

In some implementations, the opening 244 may be any suitable shape. For example, as shown in FIG. 5, in some implementations, the opening 244 may be at least generally circular.

In some implementations, the opening 244 may be configured to receive a fastener, such as the bracket fastener 250 described below, to secure the attachment bracket 240 to a truck bed.

As shown in FIG. 5, in some implementations, the attachment bracket 240 may further comprise one or more bracket fasteners 250. In some implementations, the bracket fastener 250 may be any suitable fastener that can attach the attachment bracket 240 to a truck bed 10. For example, in some implementations, the bracket fastener 250 may comprise a bolt, a locknut, and/or other suitable fastener components.

In some implementations, the bracket fastener 250 may be any suitable fastener that can attach the attachment bracket 240 to a truck bed 10 by access and installation of the fastener 250 from just one side of the truck bed 10 that is adjacent to thereby attached attachment bracket 240.

As shown in FIG. 5, in some implementations, the bracket fastener 250 may be any suitable anchor fastener. For example, in some implementations, the bracket fastener 250 may be a BoxBolt®. In some implementations, the bracket fastener 250 may be any other suitable fastener that can be installed and secured from just the one side of a truck bed 10 that is adjacent to thereby attached attachment bracket 240.

In some implementations, the bracket fastener 250 is configured to attach the attachment bracket 240 to a truck bed 10 for use of the truck bed safety belt 200. For example, in some implementations, the bracket fastener 250 may be configured to attach the attachment bracket 240 to a truck bed 10 by inserting the bracket fastener 250 through an opening 245 in the elongated piece 241 of the attachment bracket 240 and through an opening in the truck bed 10.

As shown in FIGS. 6 and 7, in some implementations, the bracket fastener 250 may be configured to attach the attachment bracket 240 to a truck bed 10 by inserting the bracket fastener 250 through an opening 244 in an extension piece 242, 243 of the attachment bracket 240 and through an opening in the truck bed 10. FIG. 6 illustrates a topside or exterior view of the installation of the bracket fastener 250 attaching the attachment bracket 240 to the truck bed 10. FIG. 7 illustrates a bottom or underside view of the installation of the bracket fastener 250 attaching the attachment bracket 240 to the truck bed 10.

In some implementations, the bracket fastener 250 may be configured to attach the attachment bracket 240 to a truck bed 10 in any other suitable way for use of the truck bed safety belt 200.

As shown in FIGS. 5 and 6, in some implementations, the attachment bracket 240 is configured to allow the attachment of the truck bed safety belt 200 to a truck bed 10 for use of the truck bed safety belt 200. For example, in some implementations, the attachment bracket 240 is configured to be attached to a truck bed 10. In some implementations, the attachment bracket 240 is configured for the belt portions 220, 221 to be attached to the attachment bracket 240, such as by the respective attachment mechanisms 210, 211.

In some implementations, the attachment bracket 240 may be configured to be attached to a truck bed 10 by the elongated piece 241. For example, in some implementations, the attachment bracket 240 may be configured such that a fastener, such as the bracket fastener 250, can be inserted through one or more of the openings 245 of the elongated piece 241 and into the truck bed 10. In some implementations, the fastener may be inserted into an existing or pre-made opening in the truck bed to attach the attachment bracket 240 to the truck bed 10 by the elongated piece 241.

In some implementations, the attachment bracket 240 may be configured to be attached to a truck bed 10 by the elongated piece 241 by one fastener. In some implementations, the attachment bracket 240 may be configured to be attached to a truck bed 10 by the elongated piece 241 by two fasteners. In some implementations, the attachment bracket 240 may be configured to be attached to a truck bed 10 by the elongated piece 241 by more than two fasteners.

In some implementations, the attachment bracket 240 may be configured to be attached to a truck bed 10 by the elongated piece 241 being attached to a wall (e.g., a vertical portion) of the truck bed 10. In some implementations, the attachment bracket 240 may be configured to be attached to a truck bed 10 by the elongated piece 241 being attached to a floor (e.g., a horizontal portion) of the truck bed 10. In some implementations, the attachment bracket 240 may be configured to be attached to a truck bed 10 by the elongated piece 241 being attached to any other suitable portion of the truck bed 10.

In some implementations, the attachment bracket 240 may be configured to be attached to a truck bed 10 by the one or more of the extension pieces 242, 243. For example, in some implementations, the attachment bracket 240 may be configured such that a fastener, such as the bracket fastener 250, can be inserted through the opening 244 of the one or more extension pieces 242, 243 and into the truck bed 10. In some implementations, the fastener may be inserted into an existing or pre-made opening in the truck bed to attach the attachment bracket 240 to the truck bed 10 by the one or more extension pieces 242, 243.

In some implementations, the attachment bracket 240 may be configured to be attached to a truck bed 10 by the one or more of the extension pieces 242, 243 by one fastener respectively. For example, in some implementations, the attachment bracket 240 may be configured to be attached to a truck bed 10 by one bracket fastener 250 respectively through the opening 244 of each extension piece 242, 243. In some implementations, the attachment bracket 240 may be configured to be attached to a truck bed 10 by the one or more of the extension pieces 242, 243 by more than one fastener respectively.

In some implementations, the attachment bracket 240 may be configured to be attached to a truck bed 10 by the one or more of the extension pieces 242, 243 being attached to a floor (e.g., a horizontal portion) of the truck bed 10. For example, as shown in FIG. 6, in some implementations, the attachment bracket 240 may be configured to be attached to a truck bed 10 by the extension pieces 242, 243 being attached to the floor of the truck bed 10, such as with the elongated piece 241 positioned adjacent to a wall (e.g., a vertical portion) of the truck bed 10.

In some implementations, the attachment bracket 240 may be configured to be attached to a truck bed 10 by the one or more of the extension pieces 242, 243 being attached to a wall (e.g., a vertical portion) of the truck bed 10. In some implementations, the attachment bracket 240 may be configured to be attached to a truck bed 10 by the one or more of the extension pieces 242, 243 being attached to any other suitable portion of the truck bed 10.

In some implementations, the attachment bracket 240 may be configured to be removably attached to a truck bed 10.

In some implementations, the attachment bracket 240 may be configured to attach, such as described above, to a bed of any other suitable vehicle.

In some implementations, the attachment bracket 240 may be configured for the belt portions 220, 221 to be attached to the attachment bracket 240 by the respective attachment mechanisms 210, 211. For example, as shown in FIGS. 5 and 6, in some implementations, the attachment bracket 240 may be configured for each attachment mechanism 210, 211 to be attached to the attachment bracket 240 by a fastener, such as described above, inserted through the opening of the attachment mechanism 210, 211 and a respective opening 245 of the elongated piece 241.

In some implementations, the attachment bracket 240 may be configured for the attachment mechanisms 210, 211 to be removably attached to the attachment bracket 240.

In some implementations, the attachment bracket 240 may be configured for the attachment mechanisms 210, 211 to be adjustably attached to the attachment bracket 240. For example, in some implementations, the attachment bracket 240 may be configured such that the attachment mechanisms 210, 211 can be adjustably attached to the attachment bracket 240 closer together or farther apart, such as to adjust the width between the attachment mechanisms 210, 211.

In some implementations, the attachment bracket 240 may be configured such that the attachment mechanisms 210, 211 can be adjustably attached to the attachment bracket 240 higher or lower, such as to adjust the height of the belt portions 220, 221 from the floor or other portion of the truck bed 10.

In some implementations, the attachment bracket 240 may be configured such that the attachment mechanisms 210, 211 can be adjustably attached to the attachment bracket 240 by moving the attachment mechanisms 210, 211 closer together or farther apart within a respective slot-shaped opening 245 of the elongated piece 241.

In some implementations, the attachment bracket 240 may be configured such that the attachment mechanisms 210, 211 can be adjustably attached to the attachment bracket 240 by reattaching the attachment mechanisms 210, 211 closer together or farther apart in other (e.g., adjacent) respective openings 245 of the elongated piece 241.

In some implementations, the attachment bracket 240 may be configured such that the attachment mechanisms 210, 211 can be adjustably attached to the attachment bracket 240 by reattaching the attachment mechanisms 210, 211 in a higher or lower positioning in other (e.g., adjacent) respective openings 245 of the elongated piece 241 that are arranged in a higher or lower row of the openings 245, as described above.

In some implementations, the attachment bracket 240 may be configured to be adjustable in length, attachment height, or other suitable dimension. For example, in some implementations, the attachment bracket 240 may be configured to be adjustable in length by an adjustable length configuration of the elongated piece 241. In some implementations, the attachment bracket 240 may be configured to be adjustable in attachment height by an adjustable positioning configuration of the extension pieces 242, 243 extending from the elongated piece 241.

In some implementations, the attachment bracket 240 may be configured to be adjustable in any other suitable way.

In some implementations, the truck bed safety belt 100, 200 comprises any suitable dimensions.

In some implementations, the truck bed safety belt 100, 200 is composed of any suitable materials, such as the above described examples.

In some implementations, the truck bed safety belt 100, 200 can have any suitable appearance, such as the examples shown in the FIGs.

In some implementations, an example method of using the truck bed safety belt 100, with respect to the above-described FIGs., comprises attaching the truck bed safety belt 100 to a portion of a truck bed 10, such as of a pickup truck 8, by the attachment mechanisms 110, 111. In some implementations, the truck bed safety belt 100 is attached to the truck bed 10 by attaching the attachment mechanisms 110, 111 to a vertical portion such as a wall or to a horizontal portion such as the floor of the truck bed 10. In some implementations, the truck bed safety belt 100 is attached to the truck bed 10 by attaching the attachment mechanisms 110, 111 with bolts or other fasteners or magnetically.

In some implementations, the method comprises connecting the truck bed safety belt 100 to safely restrain or otherwise secure a user riding as a passenger in the truck bed 10 of the pick up truck 8. In some implementations, the belt portions 120, 121 are extended from the attachment mechanisms 110, 111 around the user's waist or other suitable position. In some implementations, the belt portions 120, 121 are connected together by the buckle and the snap parts 130, 131.

In some implementations, the user can be released from the truck bed safety belt 100 by disconnecting the buckle and the snap parts 130, 131.

In some implementations, the truck bed safety belt 100 may be removable from the pickup truck bed 10 by detaching the attachment mechanisms 110, 111.

FIGS. 8-11 illustrate an example use of the truck bed safety belt 200 according to the present disclosure. In some implementations, an example method of using the truck bed safety belt 200, with respect to the above-described FIGs., comprises attaching the attachment bracket 240 to a truck bed 10, such as of a pickup truck 8.

In some implementations, the attachment bracket 240 is attached to the truck bed 10 by inserting a bracket fastener 250 respectively through one or more openings 245 in the elongated piece 241 of the attachment bracket 240 and through a respective opening in the truck bed 10 wall, floor, or other portion. In some implementations, the opening in the truck bed 10 is pre-made, e.g. drilled first, or is an existing opening in the truck bed 10.

As shown in FIG. 6, in some implementations, the attachment bracket 240 is attached to the truck bed 10 by inserting a bracket fastener 250 respectively through the opening 244 of one or more extension pieces 242, 243 of the attachment bracket 240 and through a respective opening in the truck bed 10 floor, wall, or other portion.

In some implementations, the method comprises attaching the belt portions 220, 221 to the attachment bracket 240. In some implementations, the belt portions are attached respectively to the attachment bracket 240 by the attachment mechanisms 210, 211.

For example, as shown in FIGS. 5 and 6, in some implementations, the attachment is made by a fastener inserted respectively through an opening at the first or proximal end of the belt portions 220, 221 and through a respective opening 245 in the elongated piece 241 of the attachment bracket 240.

In some implementations, the method comprises connecting the truck bed safety belt 200 to safely restrain or otherwise secure a user riding as a passenger in the truck bed 10. In some implementations, the belt portions 220, 221 are extended from the attachment mechanisms 210, 211 around the user's waist or other suitable position. In some implementations, the belt portions 220, 221 are connected together by the buckle and the snap parts 230, 231.

In some implementations, the user can be released from the truck bed safety belt 200 by disconnecting the buckle and the snap parts 230, 231.

In some implementations, the method may further comprise adjusting the width, such increasing or decreasing the width, between the attachments of the belt portions 220, 221 to the attachment bracket 240 by reattaching the the attachment mechanisms 210, 211 to other openings 245 of the elongated piece 241 as described above for the initial attachments.

In some implementations, the method may further comprise adjusting the height, such increasing or decreasing the height with respect to the truck bed 10 floor, of the belt portions 220, 221 attachments to the attachment bracket 240 by reattaching the attachment mechanisms 210, 211 to other openings 245 of the elongated piece 241.

In some implementations, the method may further comprise detaching the belt portions 220, 221 from the attachment bracket 240 by removing the attachment mechanism 210, 211 fasteners from the openings 245 of the attachment bracket 240.

In some implementations, the method may further comprise detaching the attachment bracket 240 from the truck bed 10 by removing the bracket fastener 250 from the opening 244 of the extensions 242, 243 of the attachment bracket 240.

Figure 8:
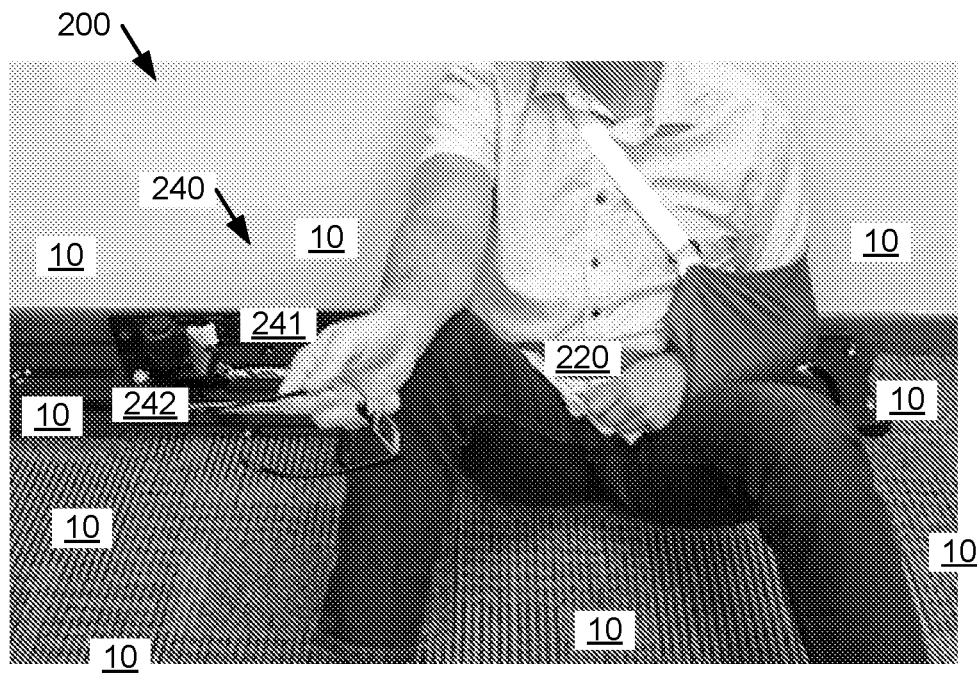
FIGS. 8-11 illustrate an example use of the truck bed safety belt according to the present disclosure.
Figure 9:
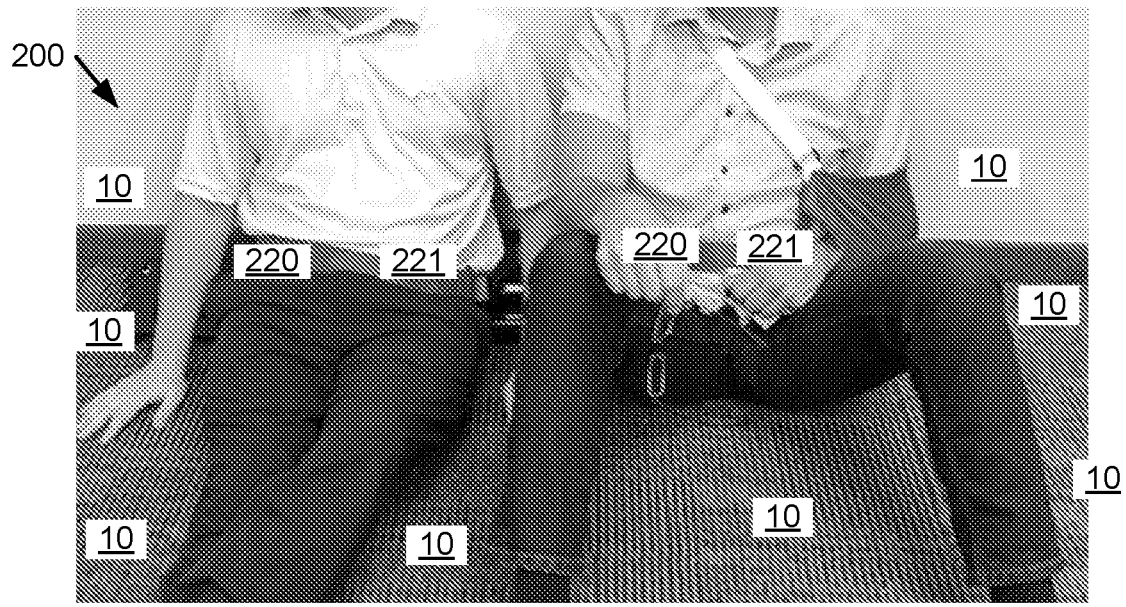

As shown in FIG. 8, in some implementations, one set of belt portions 220, 221 may be attached to the attachment bracket 240 for use of the truck bed safety belt 240, such as to restrain at least one user. As shown in FIG. 9, in some implementations, more than one set (e.g., two sets) of belt portions 220, 221 may be attached to the attachment bracket 240 for use of the truck bed safety belt 240, such as to restrain more than one user.

Figure 10:
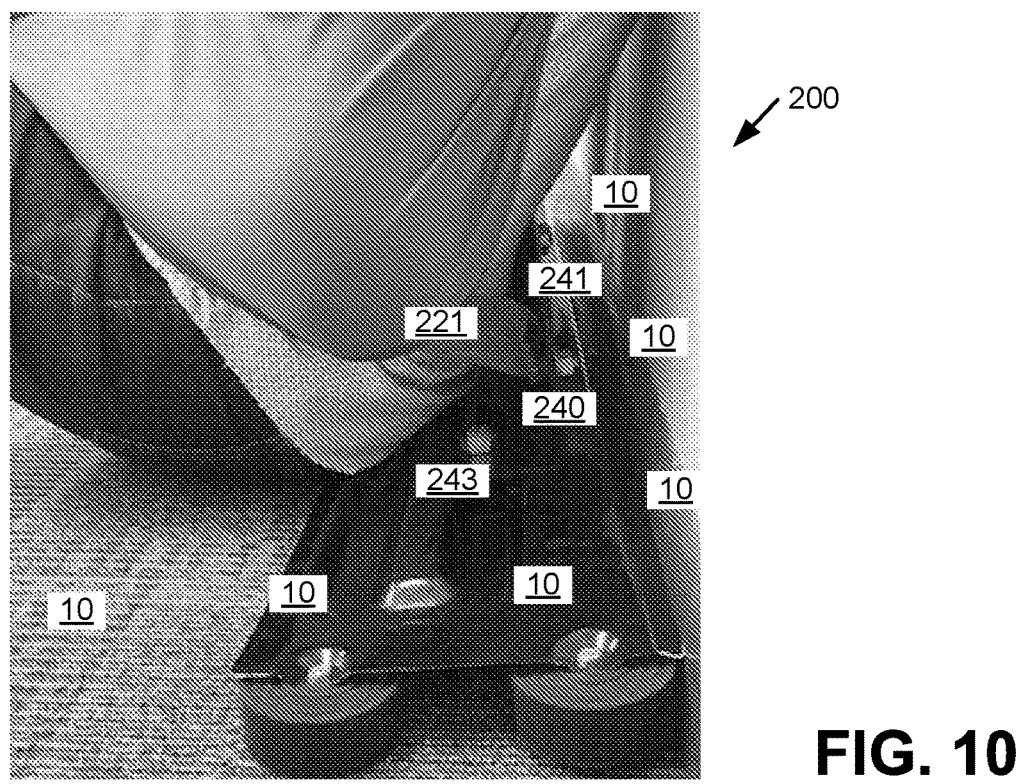
Figure 11:
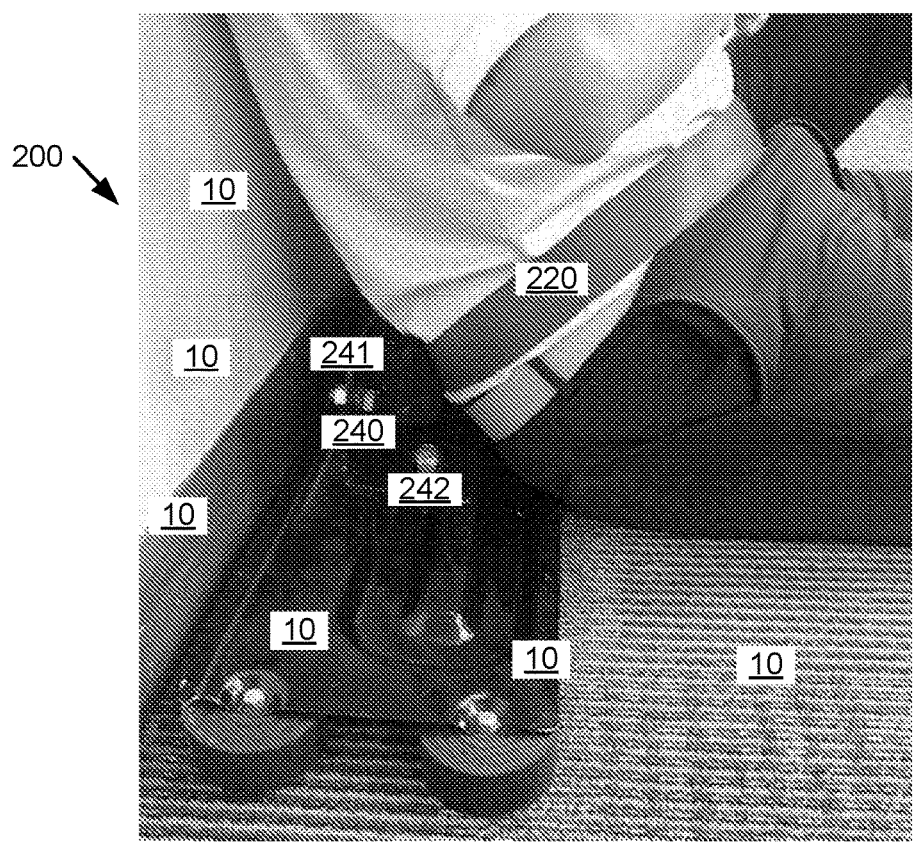

FIGS. 10 and 11 illustrate side views of the installation and use as described above of the truck bed safety belt 200.

The figures, including photographs and drawings, comprised herewith may represent one or more implementations of the truck bed safety belt.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A truck bed seat belt apparatus comprising:
an attachment bracket, a first belt portion, a second belt portion, a first attachment portion, a second attachment portion, a first connection portion, and a second connection portion, wherein:
the first belt portion comprises a first elongated piece of material extending between first side and a second side, wherein the first attachment portion is connected to the first belt portion on the first side and the first connection portion is connected to the first belt portion on the second side;
the second belt portion comprises a second elongated piece of material extending between a first side and a second side, wherein the second attachment portion is connected to the second belt portion on the first side and the second connection portion is connected to the second belt portion on the second side and is configured to connect to the first connection portion;
the attachment bracket comprises an elongated piece of material extending lengthwise in a first direction and at least one extension piece extending from the elongated piece of material in a second direction, wherein the elongated piece of material comprises a first surface extending lengthwise between a first side and a second side and extending widthwise between a third side and a fourth side; a second surface, opposite the first surface extending lengthwise between the first side and the second side and extending widthwise between the third side and the fourth side; a first opening extending through the elongated piece of material from the first surface to the second surface and configured to receive a first fastener configured to attach the first attachment portion to the attachment bracket; and a second opening extending through the elongated piece of material from the first surface to the second surface and configured to receive a second fastener configured to attach the second attachment portion to the attachment bracket; and
the at least one extension piece comprises a piece of material extending from the first surface of the elongated piece of material, wherein the piece of material comprises a first surface and a second surface opposite the first surface; and an opening extending through the at least one extension piece from the first surface to the second surface and configured to receive a third fastener configured to attach the attachment bracket to the bed of the truck.

2. The truck bed seat belt apparatus of claim 1, wherein:
the first connection portion comprises a seat belt tongue; and
the second connection portion comprises a seat belt buckle.

3. The truck bed seat belt apparatus of claim 1, further comprising two extension pieces extending from the elongated piece of material in the second direction, wherein:
a first of the extension pieces extends from the elongated piece of material adjacent to a first side of the elongated piece of material; and
a second of the extension pieces extends from the elongated piece of material adjacent to a second side of the elongated piece of material.

4. The truck bed safety belt apparatus of claim 1, further comprising the first fastener, the second fastener, and the third fastener, wherein:
the first fastener and the second fastener each comprise a screw fastener; and
the third fastener comprises an anchor fastener configured to extend into and attach to the bed of the truck.

5. A method of installing the truck bed seat belt apparatus of claim 1, comprising:
attaching the attachment bracket to a bed of a truck by the third fastener through the opening of the extension piece;
attaching the first attachment portion to the attachment bracket by the first fastener through the first opening of the elongated piece of material; and
attaching the second attachment portion to the attachment bracket, by the second fastener through the second opening of the elongated piece of material, positioned away from the first attachment portion such that the first belt portion and the second belt portion can be positioned over a user in the bed of the truck and connected together by the first connection portion and the second connection portion to secure the user in the bed of the truck.

6. The method of claim 5, further comprising:
positioning the first belt portion and the second belt portion over a user in the bed of the truck; and
connecting the first belt portion and the second belt portion together by the first connection portion and the second connection portion such that the user is secured in the bed of the truck.

7. A truck bed seat belt apparatus comprising:
a first belt portion, a second belt portion, a first attachment portion, a second attachment portion, a first connection portion, a second connection portion, and an attachment bracket, wherein:
the first belt portion comprises a first elongated piece of material extending between a first side and a second side, wherein:
the first attachment portion is connected to the first belt portion on the first side and is configured to attach to the attachment bracket; and
the first connection portion is connected to the first belt portion on the second side and is configured to connect to the second connection portion;
the second belt portion comprises a second elongated piece of material extending between a first side and a second side, wherein:
the second attachment portion is connected to the second belt portion on the first side and is configured to attach to the attachment bracket; and
the second connection portion is connected to the second belt portion on the second side and is configured to connect to the first connection portion; and
the attachment bracket comprises:
an elongated piece of material extending lengthwise in a first direction; and
at least one extension piece extending from the elongated piece of material in a second direction; wherein:
the elongated piece of material comprises:
a first surface extending lengthwise between a first side and a second side and extending widthwise between a third side and a fourth side;
a second surface, opposite the first surface, extending lengthwise between the first side and the second side and extending widthwise between the third side and the fourth side;
a first opening extending through the elongated piece of material from the first surface to the second surface and configured configured to receive a first fastener configured to attach the first attachment portion to the attachment bracket; and
a second opening extending through the elongated piece of material from the first surface to the second surface and configured to receive a second fastener configured to attach the second attachment portion to the attachment bracket; and
the at least one extension piece comprises a piece of material extending from the first surface of the elongated piece of material, the piece of material comprising:
a first surface and a second surface opposite the first surface; and
an opening extending through the at least one extension piece from the first surface to the second surface and configured to receive a third fastener configured to attach the attachment bracket to the bed of the truck.

8. The truck bed seat belt apparatus of claim 7, further comprising two extension pieces extending from the elongated piece of material in the second direction, wherein:
a first of the extension pieces extends fromthe elongated piece of material adjacent to a first side of the elongated piece of material; and
a second of the extension pieces extends from the elongated piece of material adjacent to a second side of the elongated piece of material.

9. The truck bed seat belt apparatus of claim 7, wherein:
the first attachment portion comprises an opening therethrough configured to receive the first fastener; and
the second attachment portion comprises an opening therethrough configured to receive the second fastener.

10. The truck bed seat belt apparatus of claim 7, wherein:
the first connection portion comprises a seat belt tongue; and
the second connection portion comprises a seat belt buckle.

11. The truck bed safety belt apparatus of claim 7, further comprising the first fastener, the second fastener, and the third fastener, wherein:
the first fastener and the second fastener each comprise a screw fastener; and
the third fastener comprises an anchor fastener configured to extend into and attach to the bed of the truck.

12. A method of installing the truck bed seat belt apparatus of claim 7, comprising:
attaching the attachment bracket to a bed of a truck by the third fastener through the opening of the extension piece;
attaching the first attachment portion to the attachment bracket by the first fastener through the first opening of the elongated piece of material; and
attaching the second attachment portion to the attachment bracket, by the second fastener through the second opening of the elongated piece of material, positioned away from the first attachment portion such that the first belt portion and the second belt portion can be positioned over a user in the bed of the truck and connected together by the first connection portion and the second connection portion to secure the user in the bed of the truck.

13. The method of claim 12, further comprising:

positioning the first belt portion and the second belt portion over a user in the bed of the truck; and connecting the first belt portion and the second belt portion together by the first connection portion and the second connection portion such that the user is secured in the bed of the truck.

14. A method of installing the truck bed seat belt apparatus of claim 7, comprising:

forming an opening into a floor of a bed of a truck, wherein the opening is configured to receive the third fastener;

attaching the attachment bracket to the floor of the bed of the truck by the third fastener through the opening of the extension piece and into the opening of the floor of the bed of the truck, wherein the elongated piece of material is positioned adjacent to a wall of the bed of the truck;

attaching the first attachment portion to the attachment bracket by the first fastener through the first opening of the elongated piece of material; and attaching the second attachment portion to the attachment bracket, by the second fastener through the second opening of the elongated piece of material, positioned away from the first attachment portion such that the first belt portion and the second belt portion can be positioned over a user in the bed of the truck and connected together by the first connection portion and the second connection portion to secure the user in the bed of the truck.

15. The method of claim 14, further comprising:

the user sitting on the floor of the bed of the truck adjacent to the elongated piece of material in between the first attachment portion and the second attachment portion;

positioning the first belt portion and the second belt portion over the user; and connecting the first belt portion and the second belt portion together by the first connection portion and the second connection portion such that the user is secured in the bed of the truck sitting on the floor adjacent to the wall.

* * * * *